US012346775B2

United States Patent
Griffin et al.

(10) Patent No.: US 12,346,775 B2
(45) Date of Patent: Jul. 1, 2025

(54) MIGRATING QUANTUM SERVICES BASED ON TEMPERATURE THRESHOLDS

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 861 days.

(21) Appl. No.: 17/559,452

(22) Filed: Dec. 22, 2021

(65) Prior Publication Data

US 2023/0196177 A1 Jun. 22, 2023

(51) Int. Cl.
*G06N 10/80* (2022.01)
*H04L 67/1017* (2022.01)

(52) U.S. Cl.
CPC ......... *G06N 10/80* (2022.01); *H04L 67/1017* (2013.01)

(58) Field of Classification Search
CPC .... G06N 10/80; G06N 10/00; H04L 67/1017; H04L 67/1004; H04L 67/1001; H04L 67/10; G06F 9/5088; G06F 9/5083; G06F 9/505
USPC ............................. 706/62; 718/105, 101, 100
See application file for complete search history.

(56) References Cited

U.S. PATENT DOCUMENTS

| 8,266,254 B2 | 9/2012 | Garrison et al. |
| 9,459,633 B2 | 10/2016 | Geissler et al. |
| 10,120,727 B2 | 11/2018 | Bartfai-Walcott et al. |
| 10,127,080 B2 | 11/2018 | Farhan et al. |
| 2009/0089792 A1* | 4/2009 | Johnson ................ G06F 9/4881 718/108 |
| 2009/0265568 A1* | 10/2009 | Jackson ................ G06F 1/3203 713/320 |
| 2010/0217454 A1* | 8/2010 | Spiers ................ H05K 7/20836 713/320 |

(Continued)

FOREIGN PATENT DOCUMENTS

RU 2733058 C1 9/2020

OTHER PUBLICATIONS

Yang et al., "Dynamic Thermal Management through Task Scheduling", ISPASS 2008—IEEE International Symposium on Performance Analysis of Systems and software, Apr. 2008, pp. 191-201. (Year: 2008).*

(Continued)

*Primary Examiner* — Hwei-Min Lu
(74) *Attorney, Agent, or Firm* — Dority & Manning, P.A.

(57) ABSTRACT

Migrating quantum services based on temperature thresholds is disclosed herein. In one example, a first processor device of a first quantum computing device determines that a temperature of a second quantum computing device has exceeded a temperature threshold. The first processor device identifies a quantum service, executing on the second quantum computing device, for migration, and identifies a third quantum computing device of the quantum computing system as a migration destination for the quantum service. The first processor device of the first quantum computing device configures the second quantum computing device to place the quantum service in an inactive state, and transfers the quantum service from the second quantum computing device to the third quantum computing device. The first processor device then initiates execution of the quantum service on the third quantum computing device.

20 Claims, 7 Drawing Sheets

(56) References Cited

U.S. PATENT DOCUMENTS

| | | | | |
|---|---|---|---|---|
| 2011/0047554 | A1* | 2/2011 | Lakshmanan | G06F 9/505 |
| | | | | 718/105 |
| 2013/0160003 | A1* | 6/2013 | Mann | G06F 9/5088 |
| | | | | 718/1 |
| 2013/0305067 | A1* | 11/2013 | Lefurgy | G06F 1/206 |
| | | | | 713/320 |
| 2016/0124476 | A1* | 5/2016 | Mittal | G06F 1/324 |
| | | | | 713/320 |
| 2020/0125402 | A1* | 4/2020 | Griffin | G06N 10/60 |
| 2020/0128063 | A1* | 4/2020 | Griffin | H04L 67/289 |
| 2020/0174836 | A1* | 6/2020 | Gunnels | G06F 9/5044 |
| 2020/0257566 | A1 | 8/2020 | Ganguli et al. | |
| 2022/0051121 | A1* | 2/2022 | Griffin | G06N 10/20 |
| 2022/0308916 | A1* | 9/2022 | Griffin | G06F 9/4856 |

OTHER PUBLICATIONS

Kinger et al., "Prediction Based Proactive Thermal Virtual Machine Scheduling in Green Clouds", The Scientific World Journal, vol. 2014, published on Mar. 11, 2014. (Year: 2014).*

Kashefi et al., "Postponing wearout failures in chip multiprocessors using thermal management and thread migration", 2016 11th International Symposium on Reconfigurable Communication-centric Systems-on-Chip (ReCoSoC), Jun. 2016, pp. 1-7. (Year: 2016).*

Raden, N., "Quantum computing is right around the corner, but cooling is a problem. What are the options?" diginomica, Mar. 17, 2020, 10 pages.

Van Damme, T. et al., "Optimized Thermal-Aware Job Scheduling and Control of Data Centers," arXiv:1611.00522v1 [cs.SY], Nov. 2, 2016, 11 pages.

* cited by examiner

MIGRATING QUANTUM SERVICES BASED ON TEMPERATURE THRESHOLDS

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices to provide desired functionality. Qubits achieve optimal performance in very specific temperature ranges, and thus are sensitive to fluctuations in the operating temperature of the quantum computing device in which they are used. As quantum computing continues to increase in popularity and become more commonplace, an ability to ensure continuity of quantum services when adverse temperatures are encountered will be desirable.

SUMMARY

The examples disclosed herein migrate quantum services based on temperature thresholds in quantum computer systems. In one example, a Heat Migrator service (HMS), executing on a first quantum computing device, provides a mechanism by which a temperature of a second quantum computing device is determined to exceed a temperature threshold, and, in response, a quantum service, executing on the second quantum computing device, is migrated to a third quantum computing device to continue execution. In this manner, quantum service downtime resulting from adverse temperatures can be minimized or avoided, continuity of quantum services can be maintained, and opportunities to perform maintenance of quantum computing devices to address temperature issues can be provided.

In another example, a method for migrating quantum services based on temperature thresholds is disclosed. The method comprises determining, by a first quantum computing device, that a temperature of a second quantum computing device has exceeded a temperature threshold. The method further comprises identifying a quantum service, executing on the second quantum computing device, to be migrated. The method also comprises identifying a third quantum computing device as a migration destination for the quantum service. The method additionally comprises configuring the second quantum computing device to place the quantum service in an inactive state. The method further comprises transferring the quantum service to the third quantum computing device. The method also comprises initiating execution of the quantum service on the third quantum computing device.

In another example, a quantum computing system for migrating quantum services based on temperature thresholds is disclosed. The quantum computing system includes a first quantum computing device that comprises a first system memory, and a first processor device communicatively coupled to the first system memory. The first processor device is to determine that a temperature of a second quantum computing device has exceeded a temperature threshold. The first processor device is further to identify a quantum service, executing on the second quantum computing device, to be migrated. The first processor device is also to identify a third quantum computing device as a migration destination for the quantum service. The first processor device is additionally to configure the second quantum computing device to place the quantum service in an inactive state. The first processor device is further to transfer the quantum service to the third quantum computing device. The first processor device is also to initiate execution of the quantum service on the third quantum computing device.

In another example, a non-transitory computer-readable medium for migrating quantum services based on temperature thresholds is disclosed. The non-transitory computer-readable medium stores thereon computer-executable instructions that, when executed, cause one or more processor devices to determine, by a first quantum computing device, that a temperature of a second quantum computing device has exceeded a temperature threshold. The computer-executable instructions further cause the one or more processor devices to identify a quantum service, executing on the second quantum computing device, to be migrated. The computer-executable instructions also cause the one or more processor devices to identify a third quantum computing device as a migration destination for the quantum service. The computer-executable instructions additionally cause the one or more processor devices to configure the second quantum computing device to place the quantum service in an inactive state. The computer-executable instructions further cause the one or more processor devices to transfer the quantum service to the third quantum computing device. The computer-executable instructions also cause the one or more processor devices to initiate execution of the quantum service on the third quantum computing device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum computing device" and "second quantum computing device," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such as superposition and entanglement) that differ from those of classical (i.e., non-quantum) bits used in classical computing. Qubits may be employed by quantum services that are executed by quantum computing devices to provide desired functionality. The useful quantum properties of qubits are achieved in part by maintaining the qubits within very specific temperature ranges (e.g., at or near zero degrees (0°) Kelvin, as a non-limiting example). Deviation from these temperature ranges may result in qubit instabilities that disrupt and ultimately collapse quantum states of the qubits. Accordingly, it is desirable to provide functionality to ensure continuity of quantum services when adverse temperatures are encountered.

In this regard, examples disclosed herein implement a Heat Migrator service (HMS) for migrating quantum services based on temperature thresholds. In one example, an HMS executes on a first quantum computing device of a plurality of quantum computing devices of a quantum computing system. The HMS monitors a temperature of a second quantum computing device of the quantum computing system (e.g., by receiving temperature data from the second quantum computing device), and compares the temperature to a temperature threshold. The temperature threshold may represent a temperature at which the risk of decoherence, loss of entanglement, and/or other adverse effects on a qubit employed by a quantum service executing on the second quantum computing device increases.

If the HMS of the first quantum computing device determines that the temperature of the second quantum computing device has exceeded the temperature threshold, the HMS identifies a quantum service, executing on the second quantum computing device, to be migrated (e.g., by querying a quantum task manager of the second quantum computing device). The HMS also identifies a third quantum computing device of the quantum computing system as a migration destination for the quantum service. In some examples, the HMS may identify the third quantum computing device as the migration destination based on one or more factors such as a current processor load of the third quantum computing device, a current temperature of the third quantum computing device, a location of the third quantum computing device, a distance between the second quantum computing device and the third quantum computing device, or a shortest route between the second quantum computing device and the third quantum computing device. Thus, the third quantum computing device may be identified as the migration destination because it operates in a more favorable temperature range and/or a more favorable geographic location, and/or because the third quantum computing device is closer to the second quantum computing device and/or may be accessed via a shorter route than other quantum computing devices in the quantum computing system. Some examples may provide that the HMS may identify the third quantum computing device as the migration destination based on a round-robin selection process, in which each quantum computing device of the quantum computing system is selected in turn as a migration destination.

The HMS of the first quantum computing device configures the second quantum computing device to place the quantum service in an inactive state (e.g., by issuing a shutdown or suspend command to the quantum task manager of the second quantum computing device). The HMS then transfers the quantum service from the second quantum computing device to the third quantum computing device. In some examples, the HMS may transfer the quantum service to the third quantum computing device by first retrieving a service definition (e.g., a Quantum Assembly (QASM) file, as a non-limiting example) for the quantum service from the second quantum computing device. The service definition may be stored in a service definition repository or other persistent data store of the second quantum computing device. The HMS then transmits the service definition for the quantum service to the third quantum computing device.

Some examples may provide that that the HMS also ensures that a data value and/or a quantum state of a qubit employed by the quantum service is also transferred from the second quantum computing device to the third quantum computing device. In such examples, the HMS may identify a source qubit of the second quantum computing device associated with the quantum service (e.g., by querying a qubit registry of the second quantum computing device). The HMS may retrieve a data value of the source qubit from the second quantum computing device, and/or may retrieve a quantum state of the source qubit from the second quantum computing device. The HMS then allocates a target qubit on the third quantum computing device (e.g., by sending an allocation command to a qubit registry of the third quantum computing device), and then sets a data value of the target qubit to the data value of the source qubit and/or sets a quantum state of the target qubit to the quantum state of the source qubit. According to some examples, the HMS may configure the second quantum computing device to transfer a qubit associated with the quantum service from the second quantum computing device to the third quantum computing device (e.g., by causing a physical particle representing the qubit to be transported from the second quantum computing device to the third quantum computing device).

The HMS then initiates execution of the quantum service on the third quantum computing device (e.g., based on the service definition for the quantum service, as a non-limiting example). This may be accomplished by the HMS issuing an execution command to a quantum task manager and/or a quantum service scheduler of the third quantum computing device. In some examples, initiating execution of the quantum service on the third quantum computing device may comprise prioritizing the execution of the quantum service on the third quantum computing device. In this manner, any downtime incurred by the migration of the quantum service from the second quantum computing device to the third quantum computing device can be minimized.

Figure 1:
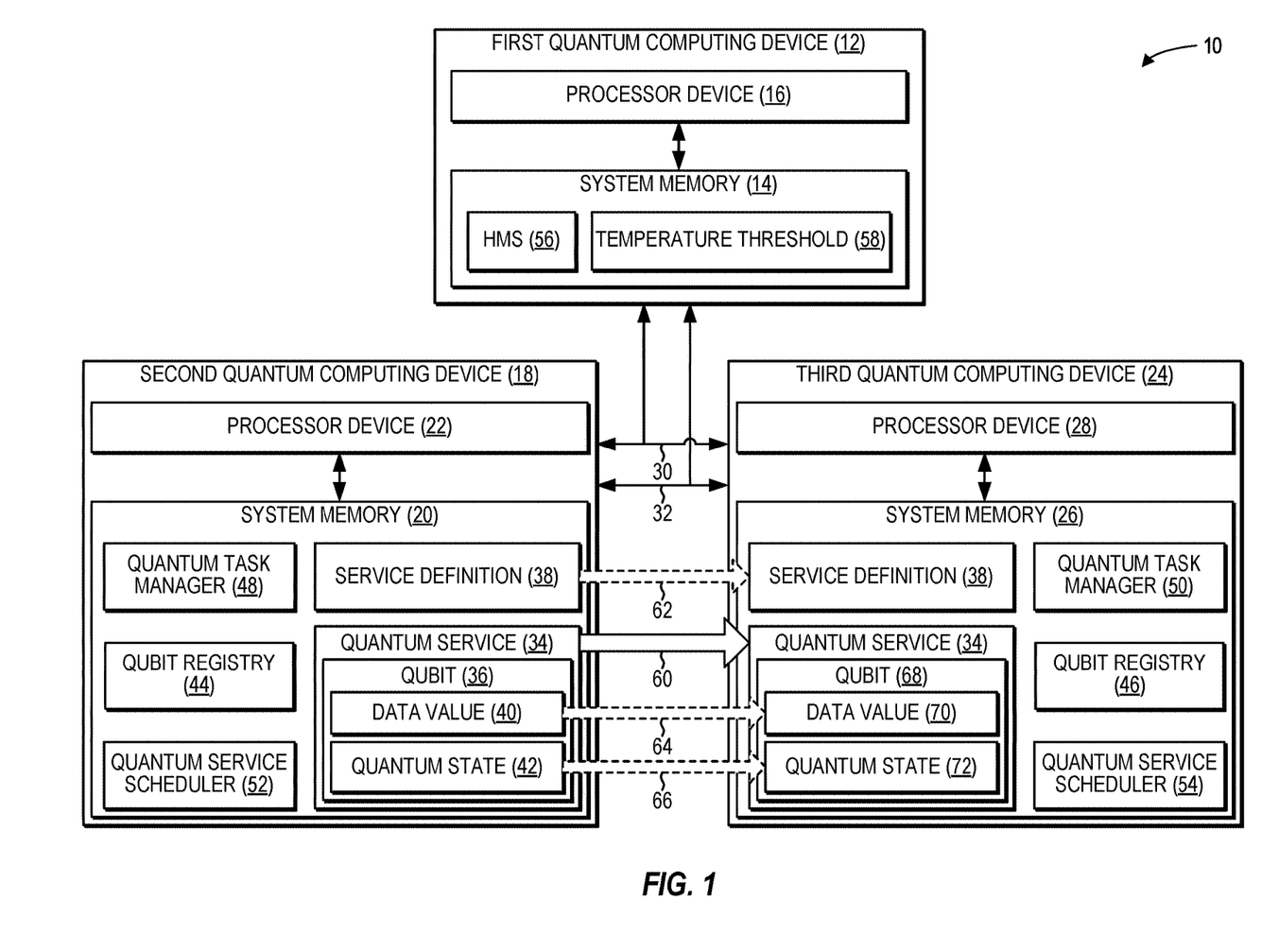
FIG. 1 is a block diagram of a quantum computing system in which examples may be practiced.

FIG. 1 is a block diagram of a quantum computing system 10 according to one example. The quantum computing system 10 includes a first quantum computing device 12 that comprises a first system memory 14 and a first processor device 16. The quantum computing system 10 further includes a second quantum computing device 18 that comprises a second system memory 20 and a second processor device 22, as well as a third quantum computing device 24 that comprises a third system memory 26 and a third processor device 28. The first quantum computing device 12, the second quantum computing device 18, and the third quantum computing device 24 in the example of FIG. 1 are communicatively coupled via a classical communications link 30, which may comprise a private network or a public network such as the internet. The first quantum computing device 12, the second quantum computing device 18, and the third quantum computing device 24 are also communicatively coupled to each other and/or to other quantum computing devices (not shown) via a quantum channel 32 over which qubits may be transmitted. It is to be understood that the quantum computing system 10, according to some examples, may include more or fewer quantum computing devices and/or classical computing devices than illustrated in FIG. 1. Additionally, the first quantum computing device 12, the second quantum computing device 18, and/or the third quantum computing device 24 in some examples may include constituent elements in addition to those illustrated in FIG. 1.

The first quantum computing device 12, the second quantum computing device 18, and the third quantum computing device 24 in the example of FIG. 1 operate in quantum environments, but are each capable of operating using classical computing principles or quantum computing principles. When using quantum computing principles, the first quantum computing device 12, the second quantum computing device 18, and the third quantum computing device 24 perform computations that utilize quantum-mechanical phenomena, such as superposition and/or entanglement states. The first quantum computing device 12, the second quantum computing device 18, and the third quantum computing device 24 may operate under certain environmental conditions, such as at or near zero degrees (0°) Kelvin. When using classical computing principles, the first quantum computing device 12, the second quantum computing device 18, and the third quantum computing device 24 utilize binary digits that have a value of either zero (0) or one (1).

In the example of FIG. 1, the second quantum computing device 18 executes a quantum service 34, which comprises a process that employs one or more qubits such as a qubit 36 to perform quantum operations. The quantum service 34 is defined by a service definition 38, which comprises quantum programming instructions for allocating and manipulating qubits to achieve a desired functionality. In some examples, the service definition 38 may comprise a QASM file. The qubit 36 of the quantum service 34 may be used to store a data value 40, and/or may have a quantum state 42 (e.g., spin, as a non-limiting example) into which the qubit 36 is programmatically placed.

To maintain information for qubits such as the qubit 36, the second quantum computing device 18 and the third quantum computing device 24 provide respective qubit registries 44 and 46, each of which comprises a plurality of qubit registry entries (not shown) that each correspond to a qubit. The qubit registry 44 and the qubit registry 46 maintain and provide access to data relating to the qubits implemented by the second quantum computing device 18 and the third quantum computing device 24, respectively, including a count of the total number of qubits implemented by the second quantum computing device 18 and the third quantum computing device 24, and a count of the number of available qubits that are currently available for allocation, as non-limiting examples. Each of the qubit registry entries of the qubit registry 44 and the qubit registry 46 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

Execution of quantum services such as the quantum service 34 is facilitated by quantum task managers 48 and 50 and quantum service schedulers 52 and 54, each of which operates in a manner analogous to their conventional classical counterparts. Thus, the quantum task manager 48 of the second quantum computing device 18 and the quantum task manager 50 of the third quantum computing device 24 handle operations for creating, monitoring, and terminating quantum services. Likewise, the quantum service scheduler 52 of the second quantum computing device 18 and the quantum service scheduler 54 of the third quantum computing device 24 control the scheduling of quantum services for execution by the second processor device 22 and the third processor device 28, respectively, and the allocation of processing resources to executing quantum services. The functionality of the quantum task managers 48 and 50 and the quantum service schedulers 52 and 54 may be made accessible to other services and processes (e.g., via defined application programming interfaces (APIs), as a non-limiting example). Although not shown in FIG. 1, it is to be understood that the first quantum computing device 12 in some examples also provides functionality corresponding to that of the qubit registries 44 and 46, the quantum task managers 48 and 50, and the quantum service schedulers 52 and 54.

As noted above, the useful quantum properties of qubits such as the qubit 36 are achieved in part by maintaining the qubits within very specific temperature ranges, such as at or near zero degrees (0°) Kelvin. If the operating temperature of a quantum computing device deviates from these temperature ranges (e.g., as a result of processor load or external environmental conditions, as non-limiting examples), qubit instabilities may result, causing disruption and ultimately collapse of quantum states of the qubits. Thus, it is desirable to provide functionality to ensure continuity of quantum services such as the quantum service 34 when adverse temperatures are encountered.

In this regard, examples disclosed herein implement an HMS 56 for migrating quantum services based on temperature thresholds. In one example, the HMS 56 is executed by the first processor device 16 of the first quantum computing device 12, and monitors a temperature of other quantum computing devices in the quantum computing system 10, such as the second quantum computing device 18. The HMS 56 compares the monitored temperature to a temperature threshold 58, which in some examples may represent a temperature at which the risk of decoherence, loss of entanglement, and/or other adverse effects on the qubit 36 employed by the quantum service 34 executing on the second quantum computing device 18 increases. Upon determining that the temperature of the second quantum computing device 18 has exceeded the temperature threshold 58, the HMS 56 identifies the quantum service 34, executing on the second quantum computing device 18, for migration. This may be accomplished by, e.g., the HMS 56 querying the quantum task manager 48 of the second quantum computing device 18 to identify currently executing quantum services.

The HMS 56 also identifies the third quantum computing device 24 of the quantum computing system 10 as a migration destination for the quantum service 34. Some examples may provide that the HMS 56 identifies the third quantum computing device 24 as the migration destination based on one or more factors such as a current processor load of the third quantum computing device 24, a current temperature of the third quantum computing device 24, a location of the third quantum computing device 24, a distance between the second quantum computing device 18 and the third quantum computing device 24, or a shortest route between the second quantum computing device 18 and the third quantum computing device 24. In some examples, the third quantum computing device 24 may be identified as the migration destination based on a round-robin selection process, in which each quantum computing device of the quantum computing system 10 is selected in turn as a migration destination.

The HMS 56 of the first quantum computing device 12 configures the second quantum computing device 18 to place the quantum service 34 in an inactive state by, for instance, issuing a shutdown or suspend command to the quantum task manager 48 of the second quantum computing device 18. The HMS 56 then transfers the quantum service 34 from the second quantum computing device 18 to the third quantum computing device 24, as indicated by arrow 60. The HMS 56 according to some examples may transfer the quantum service 34 to the third quantum computing device 24 by retrieving the service definition 38 for the quantum service 34 from the second quantum computing device 18 (e.g., from a service definition repository (not shown) or other persistent data store (not shown) of the second quantum computing device 18, as non-limiting examples). The HMS 56 then transmits the service definition 38 for the quantum service 34 to the third quantum computing device 24, as indicated by arrow 62. The third quantum computing device 24 may then employ the service definition 38 to instantiate and execute the quantum service 34, as discussed in greater detail below.

According to some examples, the HMS 56 may also transfer the data value 40 and/or the quantum state 42 of the qubit 36 employed by the quantum service 34 from the second quantum computing device 18 to the third quantum computing device 24, as indicated by arrows 64 and 66. In such examples, the HMS 56 first identifies a source qubit (e.g., the qubit 36, also referred to herein as the "source qubit 36") of the second quantum computing device 18 associated with the quantum service 34. The HMS 56 may retrieve the data value 40 of the source qubit 36 from the second quantum computing device 18, and/or may retrieve a quantum state of the source qubit 36 from the second quantum computing device 18. The HMS 56 allocates a target qubit 68 on the third quantum computing device 24, and then sets a data value 70 of the target qubit 68 to the data value 40 of the source qubit 36 and/or sets a quantum state 72 of the target qubit 68 to the quantum state 42 of the source qubit 36. Although not shown in FIG. 1, the HMS 56 according to some examples may configure the second quantum computing device 18 to transfer the qubit 36 associated with the quantum service 34 to the third quantum computing device 24 (e.g., by transporting a physical particle (not shown) representing the qubit 36 from the second quantum computing device 18 to the third quantum computing device 24).

The HMS 56 then initiates execution of the quantum service 34 on the third quantum computing device 24 (e.g., based on the service definition 38 for the quantum service 34 that was transmitted to the third quantum computing device 24 in some examples). According to some examples, the HMS 56 may issue an execution command to the quantum task manager 50 and/or the quantum service scheduler 54 of the third quantum computing device 24 to initiate execution of the quantum service 34. Some examples may provide that initiating execution of the quantum service 34 on the third quantum computing device 24 comprises prioritizing the execution of the quantum service 34 on the third quantum computing device 24 (e.g., by the HMS 56 issuing a command to the quantum task manager 50 and/or the quantum service scheduler 54 of the third quantum computing device 24 to set a priority for the quantum service 34). In this manner, any downtime incurred by the migration of the quantum service 34 from the second quantum computing device 18 to the third quantum computing device 24 may be minimized.

It is to be understood that, because the HMS 56 is a component of the first quantum computing device 12, functionality implemented by the HMS 56 may be attributed to the quantum computing system 10 generally. Moreover, in examples where the HMS 56 comprises software instructions that program the first processor device 16 to carry out functionality discussed herein, functionality implemented by the HMS 56 may be attributed herein to the first processor device 16. It is to be further understood that while, for purposes of illustration only, the HMS 56 is depicted as a single component, the functionality implemented by the HMS 56 may be implemented in any number of components, and the examples discussed herein are not limited to any particular number of components. Moreover, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2A:
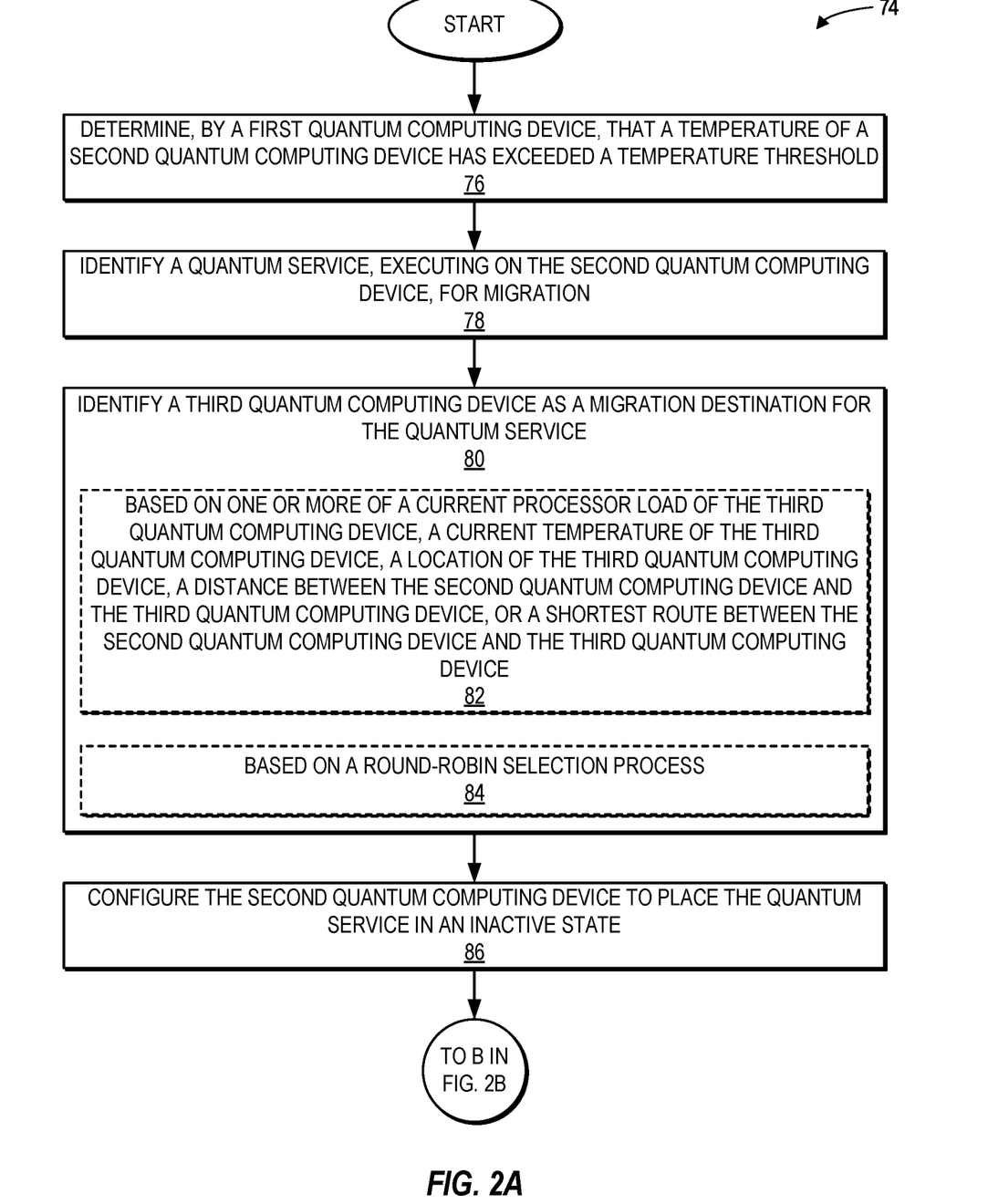
FIGS. 2A-2C are flowcharts illustrating operations performed by the quantum computing system of FIG. 1 for migrating quantum services based on temperature thresholds, according to one example.
Figure 2B:
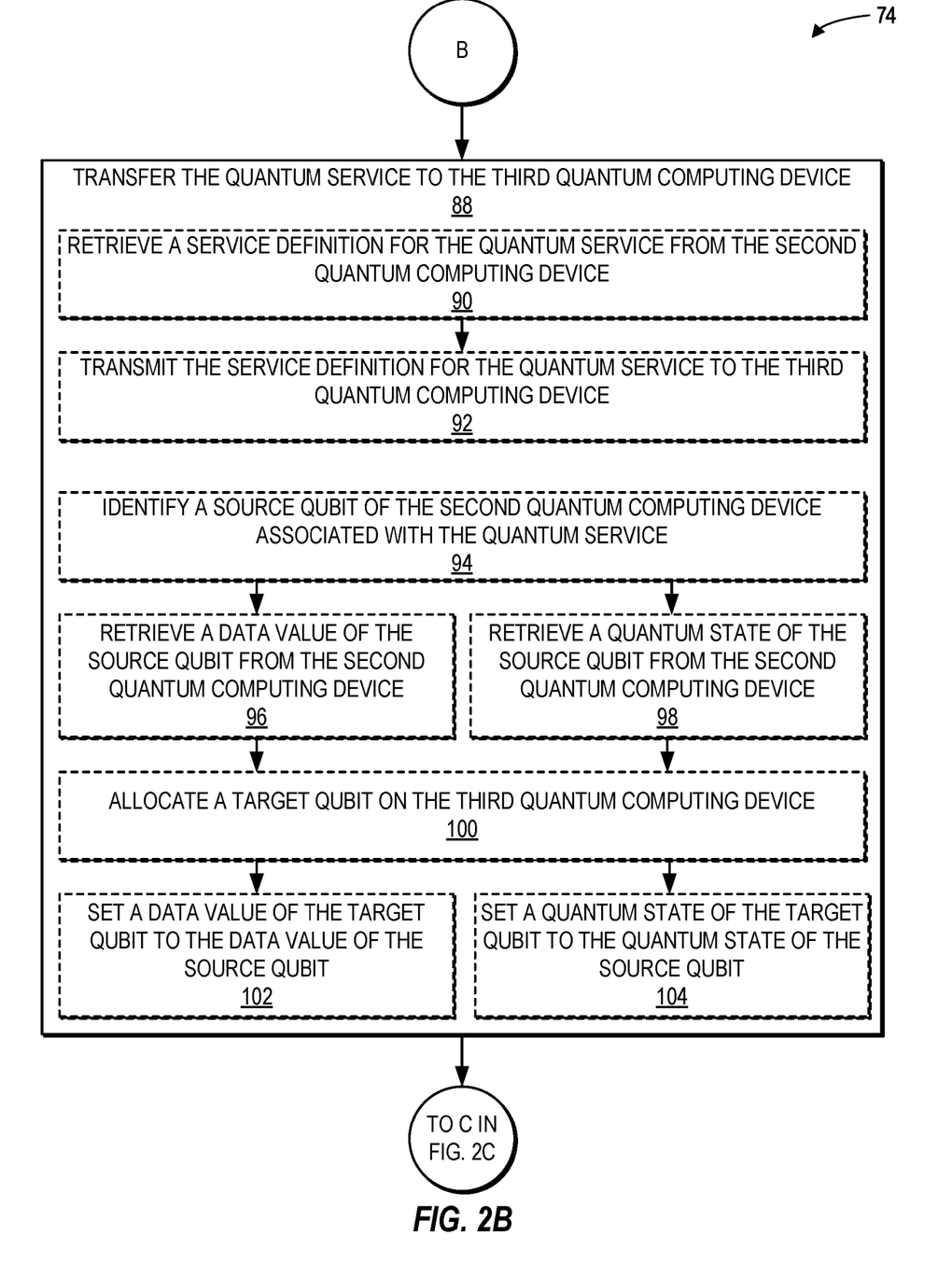
Figure 2C:
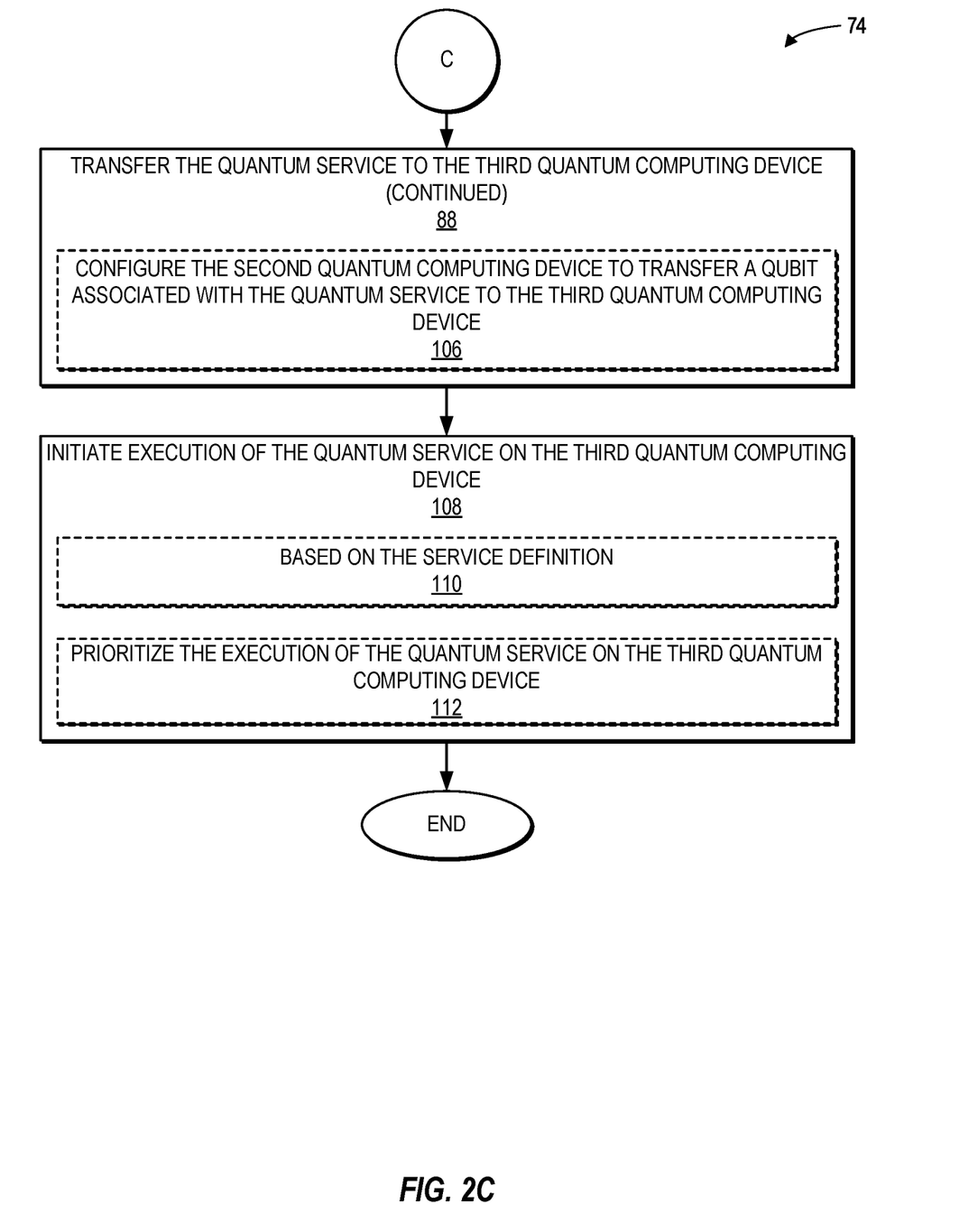

To illustrate exemplary operations performed by the quantum computing system 10 of FIG. 1 for migrating quantum services based on temperature thresholds according to one example, FIGS. 2A-2C provide a flowchart 74. For the sake of clarity, elements of FIG. 1 are referenced in describing FIGS. 2A-2C. It is to be understood that, in some examples, some operations illustrated in FIGS. 2A-2C may be performed in an order other than illustrated herein, and/or may be omitted.

Operations in FIG. 2A begin with the first processor device 16 of the first quantum computing device 12 (e.g., by executing the HMS 56) determining that a temperature of a second quantum computing device (e.g., the second quantum computing device 18 of FIG. 1) has exceeded a temperature threshold (e.g., the temperature threshold 58 of FIG. 1) (block 76). As a non-limiting example, the temperature threshold 58 may represent a temperature at which the risk of decoherence, loss of entanglement, and/or other adverse effects on qubits such as the qubit 36 increases. In response to determining that the temperature of the second quantum computing device 18 has exceeded the temperature threshold 58, the HMS 56 identifies a quantum service, executing on the second quantum computing device 18 to be migrated, such as the quantum service 34 of FIG. 1 (block 78). The HMS 56 also identifies a third quantum computing device (e.g., the third quantum computing device 24 of FIG. 1) as a migration destination for the quantum service 34 (block 80). In some examples, the operations of block 80 for identifying the third quantum computing device 24 as a migration destination for the quantum service 34 may be based one or more of a current processor load of the third quantum computing device 24, a current temperature of the third quantum computing device 24, a location of the third quantum computing device 24, a distance between the second quantum computing device 18 and the third quantum computing device 24, or a shortest route between the second quantum computing device 18 and the third quantum computing device 24 (block 82). Some examples may provide that the operations of block 80 for identifying the third quantum computing device 24 as a migration destination for the quantum service 34 may be based on a round-robin selection process, in which quantum computing devices are selected in turn as the migration destination (block 84).

The HMS 56 configures the second quantum computing device 18 to place the quantum service 34 in an inactive state (block 86). This may be accomplished by the HMS 56 issuing a suspend or shutdown command to the quantum task manager 48 of the second quantum computing device 18, as a non-limiting example. Operations then continue at block 88 of FIG. 2B.

Referring now to FIG. 2B, the HMS 56 transfers the quantum service 34 to the third quantum computing device 24 (block 88). According to some examples, the operations of block 88 for transferring the quantum service 34 to the third quantum computing device 24 may comprise first retrieving a service definition for the quantum service 34 (e.g., the service definition 38 of FIG. 1) from the second quantum computing device 18 (block 90). The HMS 56 then transmits the service definition 38 for the quantum service 34 to the third quantum computing device 24 (block 92).

Some examples may provide that the operations of block 88 for transferring the quantum service 34 to the third quantum computing device 24 may including ensuring that data values and/or quantum states of qubits associated with the quantum service 34 are transferred to the third quantum computing device 24. Thus, in such examples, the HMS 56 may first identify a source qubit of the second quantum computing device 18 (e.g., the source qubit 36 of FIG. 1) associated with the quantum service 34 (block 94). In some such examples, the HMS 56 may retrieve a data value of the source qubit 36 (e.g., the data value 40 of FIG. 1) from the second quantum computing device 18 (block 96). Some such examples may provide that the HMS 56 may retrieve a quantum state 42 of the source qubit 36 from the second quantum computing device 18 (block 98). The HMS 56 then allocates a target qubit (e.g., the target qubit 68 of FIG. 1) on the third quantum computing device 24 (block 100). In examples in which the HMS 56 retrieves the data value 40 at block 96, the HMS 56 sets a data value 70 of the target qubit 68 to the data value 40 of the source qubit 36 (block 102). In examples in which the HMS 56 retrieves the quantum state 42 at block 98, the HMS 56 sets a quantum state of the target qubit 68 (e.g., the quantum state 72 of FIG. 1) to the quantum state 42 of the source qubit 36 (block 104). Operations in some examples continue at block 106 of FIG. 2C.

Turning now to FIG. 2C, exemplary operations of block 88 for transferring the quantum service 34 to the third quantum computing device 24 are further described. In some examples, the HMS 56 may configure the second quantum computing device 18 to transfer the qubit 36 associated with the quantum service 34 to the third quantum computing device 24 (block 106). Operations of block 106 for transferring the qubit 36 may comprise causing a physical particle representing the qubit 36 to be transported from the second quantum computing device 18 to the third quantum computing device 24 via the quantum channel 32.

The HMS 56 then initiates execution of the quantum service 34 on the third quantum computing device 24 (block 108). This may be accomplished in some examples by the HMS 56 issuing a command to the quantum task manager 50 and/or the quantum service scheduler 54 of the third quantum computing device 24. Some examples may provide that the operations of block 108 for initiating execution of the quantum service 34 on the third quantum computing device 24 are based on the service definition 38 (block 110). For instance, the quantum task manager 50 and the quantum service scheduler 54 of the third quantum computing device 24 may employ the service definition 38 to launch an instance of the quantum service 34 on the third quantum computing device 24. The operations of block 108 for initiating execution of the quantum service 34 on the third quantum computing device 24 may comprise prioritizing the execution of the quantum service 34 on the third quantum computing device 24 (block 112). In this manner, any downtime associated with migrating the quantum service 34 to the third quantum computing device 24 may be minimized.

Figure 3:
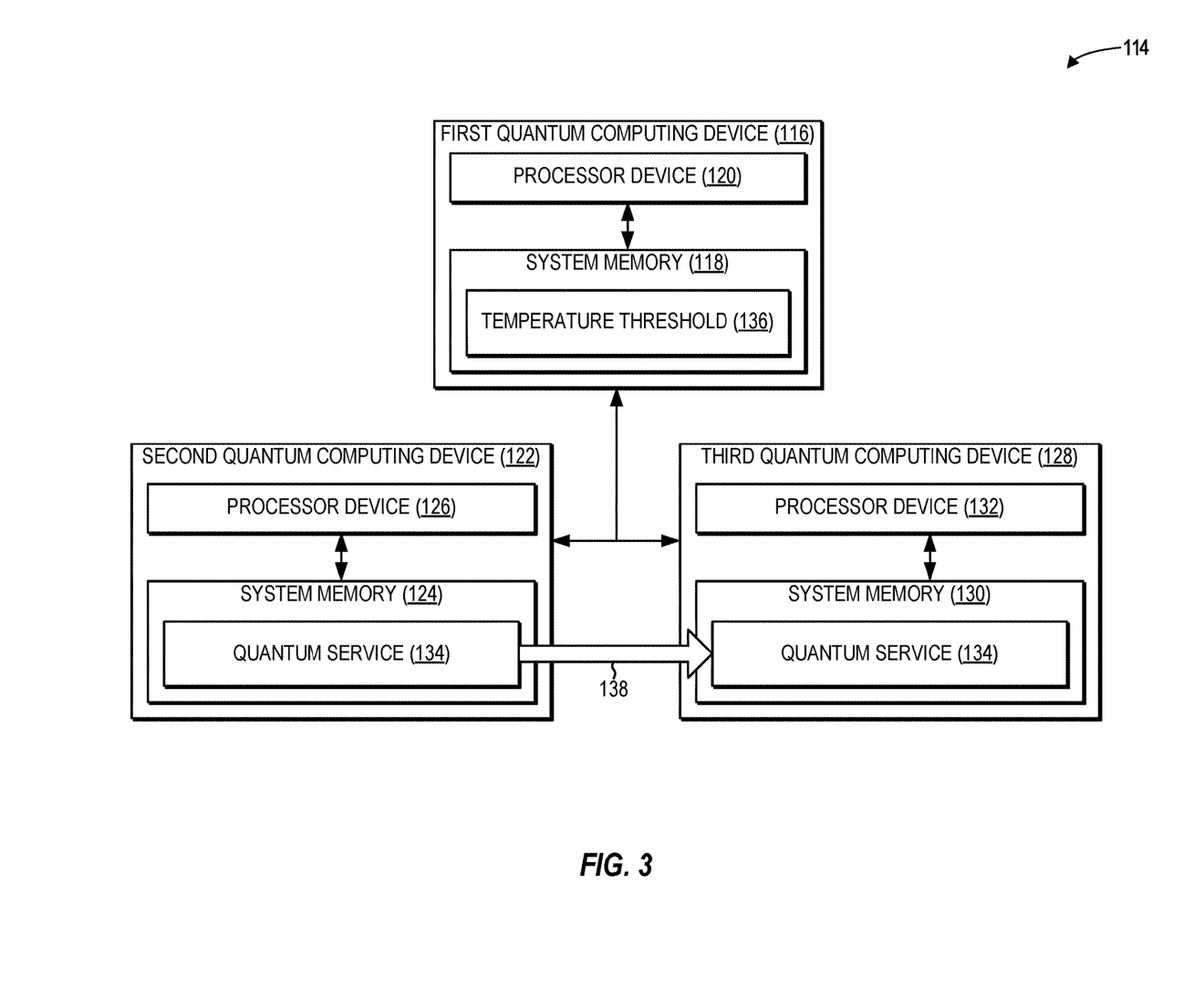
FIG. 3 is a simpler block diagram of the quantum computing system of FIG. 1 for migrating quantum services based on temperature thresholds, according to one example.

FIG. 3 is a simpler block diagram of the quantum computing system 10 of FIG. 1 for migrating quantum services based on temperature thresholds, according to one example. In the example of FIG. 3, a quantum computing system 114 includes a first quantum computing device 116 that comprises a first system memory 118 and a first processor device 120. The quantum computing system 114 further includes a second quantum computing device 122 that comprises a second system memory 124 and a second processor device 126, as well as a third quantum computing device 128 that comprises a third system memory 130 and a third processor device 132. The second quantum computing device 122 executes a quantum service 134, which comprises a process that employs one or more qubits (not shown) to perform quantum operations.

In exemplary operation, the first processor device 120 of the first quantum computing device 116 determines that a temperature of the second quantum computing device 122 has exceeded a temperature threshold 136. The first processor device 120 next identifies the quantum service 134, executing on the second quantum computing device 122, for migration, and identifies the third quantum computing device 128 of the quantum computing system 114 as a migration destination for the quantum service 134. The first processor device 120 of the first quantum computing device 116 configures the second quantum computing device 122 to place the quantum service 134 in an inactive state, and transfers the quantum service 134 from the second quantum computing device 122 to the third quantum computing device 128, as indicated by arrow 138. The first processor device 120 then initiates execution of the quantum service 134 on the third quantum computing device 128.

Figure 4:
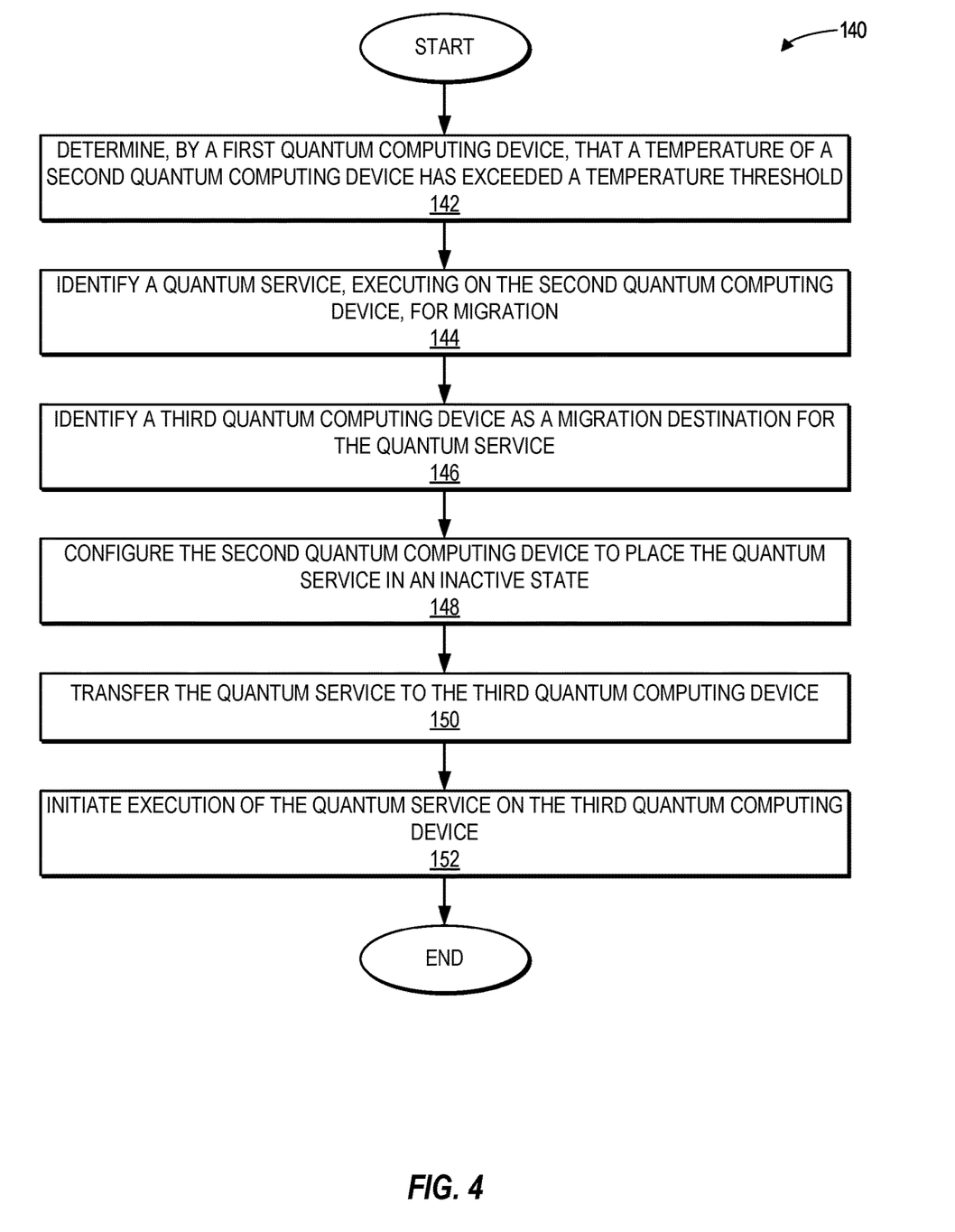
FIG. 4 is a flowchart of a simplified method for migrating quantum services based on temperature thresholds by the quantum computing device of FIG. 3, according to one example.

To illustrate a simplified method for migrating quantum services based on temperature thresholds in the quantum computing system 114 of FIG. 3 according to one example, FIG. 4 provides a flowchart 140. Elements of FIG. 3 are referenced in describing FIG. 4 for the sake of clarity. In FIG. 4, operations begin with the first processor device 120 of the first quantum computing device 116 determining that a temperature of the second quantum computing device 122 has exceeded the temperature threshold 136 (block 142). The first processor device 120 identifies the quantum service 134, executing on the second quantum computing device 122, for migration (block 144). The first processor device 120 also identifies the third quantum computing device 128 as the migration destination for the quantum service 134 (block 146). The first processor device 120 configures the second quantum computing device 122 to place the quantum service 134 in an inactive state (block 148). The first processor device 120 next transfers the quantum service 134 to the third quantum computing device 128 (block 150). The first processor device 120 then initiates execution of the quantum service 134 on the third quantum computing device 128 (block 152).

Figure 5:
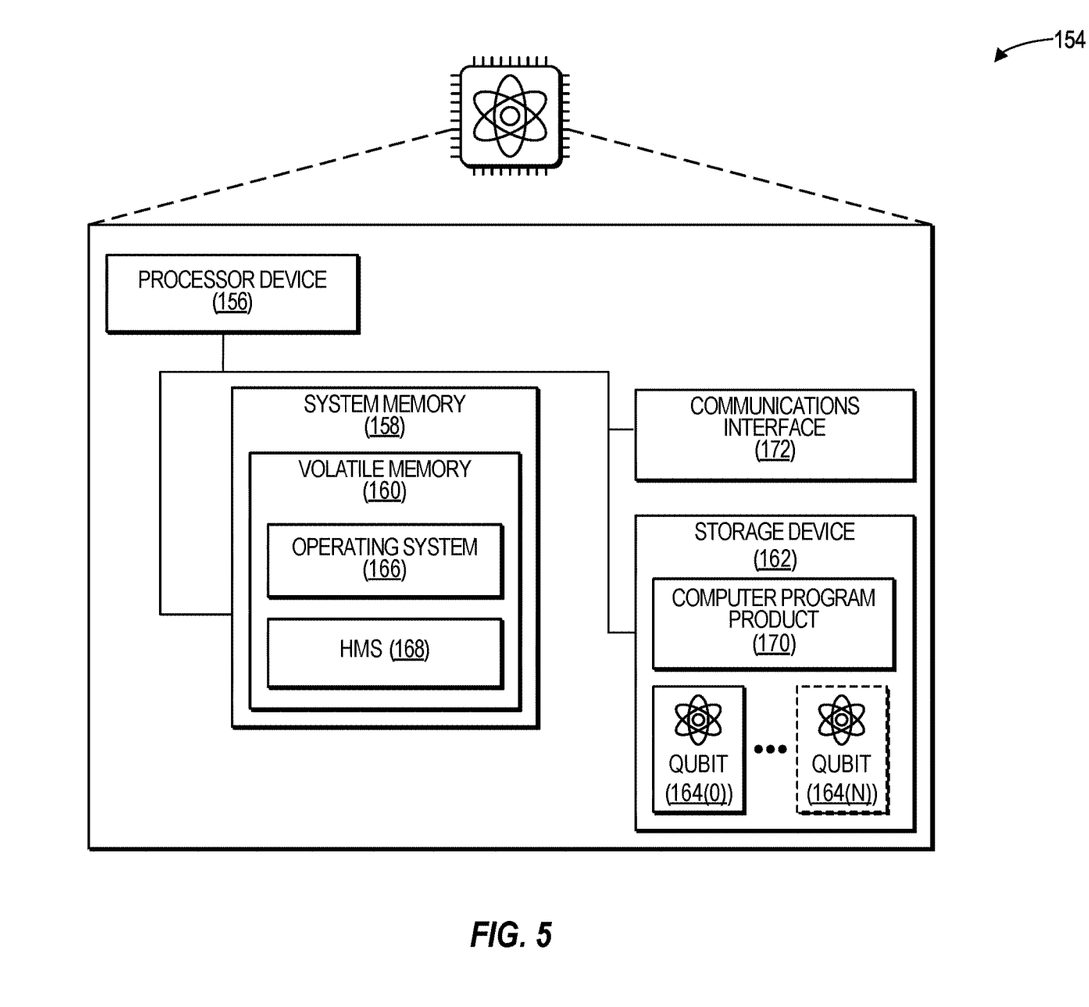
FIG. 5 is a block diagram of a quantum computing device suitable for implementing examples.

FIG. 5 is a block diagram of a quantum computing device 154, such as the first quantum computing device 12 of FIG. 1, suitable for implementing examples according to one example. The quantum computing device 154 may comprise any suitable quantum computing device or devices. The quantum computing device 154 can operate using classical computing principles or quantum computing principles. When using quantum computing principles, the quantum computing device 154 performs computations that utilize quantum-mechanical phenomena, such as superposition and entanglement. The quantum computing device 154 may operate under certain environmental conditions, such as at or near zero degrees (0°) Kelvin. When using classical computing principles, the quantum computing device 154 utilizes binary digits that have a value of either zero (0) or one (1).

The quantum computing device 154 includes a processor device 156 and a system memory 158. The processor device 156 can be any commercially available or proprietary processor suitable for operating in a quantum environment. The system memory 158 may include volatile memory 160 (e.g., random-access memory (RAM)). The quantum computing device 154 may further include or be coupled to a non-transitory computer-readable medium such as a storage device 162. The storage device 162 and other drives associated with computer-readable media and computer-usable media may provide non-volatile storage of data, data structures, computer-executable instructions, and the like. The storage device may also provide functionality for storing one or more qubits 164(0)-164(N).

A number of modules can be stored in the storage device 162 and in the volatile memory 160, including an operating system 166 and one or more modules, such as an HMS 168. All or a portion of the examples may be implemented as a computer program product 170 stored on a transitory or non-transitory computer-usable or computer-readable medium, such as the storage device 162, which includes complex programming instructions, such as complex computer-readable program code, to cause the processor device 156 to carry out the steps described herein. Thus, the computer-readable program code can comprise computer-executable instructions for implementing the functionality of the examples described herein when executed on the processor device 156.

An operator may also be able to enter one or more configuration commands through a keyboard (not illustrated), a pointing device such as a mouse (not illustrated), or a touch-sensitive surface such as a display device (not illustrated). The quantum computing device 154 may also include a communications interface 172 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
    determining, by a first quantum computing device, that a temperature of a second quantum computing device has exceeded a temperature threshold;
    identifying a quantum service, executing on the second quantum computing device, to be migrated;
    identifying a third quantum computing device as a migration destination for the quantum service;
    configuring the second quantum computing device to place the quantum service in an inactive state;
    transferring the quantum service to the third quantum computing device; and
    initiating execution of the quantum service on the third quantum computing device.

2. The method of claim 1, wherein identifying the third quantum computing device as the migration destination is based on one or more of a current processor load of the third quantum computing device, a current temperature of the third quantum computing device, a location of the third quantum computing device, a distance between the second quantum computing device and the third quantum computing device, or a shortest route between the second quantum computing device and the third quantum computing device.

3. The method of claim 1, wherein identifying the third quantum computing device as the migration destination comprises selecting the third quantum computing device based on a round-robin selection process.

4. The method of claim 1, wherein:
    transferring the quantum service to the third quantum computing device comprises:
        retrieving a service definition for the quantum service from the second quantum computing device; and
        transmitting the service definition for the quantum service to the third quantum computing device; and
    initiating execution of the quantum service on the third quantum computing device comprises initiating execution of the quantum service based on the service definition.

5. The method of claim 1, wherein transferring the quantum service to the third quantum computing device comprises:
    identifying a source qubit of the second quantum computing device associated with the quantum service;
    retrieving a data value of the source qubit from the second quantum computing device;
    allocating a target qubit on the third quantum computing device; and
    setting a data value of the target qubit to the data value of the source qubit.

6. The method of claim 1, wherein transferring the quantum service to the third quantum computing device comprises:
    identifying a source qubit of the second quantum computing device associated with the quantum service;
    retrieving a quantum state of the source qubit from the second quantum computing device;
    allocating a target qubit on the third quantum computing device; and
    setting a quantum state of the target qubit to the quantum state of the source qubit.

7. The method of claim 1, wherein transferring the quantum service to the third quantum computing device comprises configuring the second quantum computing device to transfer a qubit associated with the quantum service to the third quantum computing device.

8. The method of claim 1, wherein initiating execution of the quantum service on the third quantum computing device comprises prioritizing the execution of the quantum service on the third quantum computing device.

9. A quantum computing system, comprising a first quantum computing device comprising:
 a first system memory; and
 a first processor device communicatively coupled to the first system memory, the first processor device to:
  determine that a temperature of a second quantum computing device has exceeded a temperature threshold;
  identify a quantum service, executing on the second quantum computing device, to be migrated;
  identify a third quantum computing device as a migration destination for the quantum service;
  configure the second quantum computing device to place the quantum service in an inactive state;
  transfer the quantum service to the third quantum computing device; and
  initiate execution of the quantum service on the third quantum computing device.

10. The quantum computing system of claim 9, wherein the first processor device is to identify the third quantum computing device as the migration destination based on one or more of a current processor load of the third quantum computing device, a current temperature of the third quantum computing device, a location of the third quantum computing device, a distance between the second quantum computing device and the third quantum computing device, or a shortest route between the second quantum computing device and the third quantum computing device.

11. The quantum computing system of claim 9, wherein to identify the third quantum computing device as the migration destination is to select the third quantum computing device based on a round-robin selection process.

12. The quantum computing system of claim 9, wherein:
 to transfer the quantum service to the third quantum computing device is to:
  retrieve a service definition for the quantum service from the second quantum computing device; and
  transmit the service definition for the quantum service to the third quantum computing device; and
 to initiate execution of the quantum service on the third quantum computing device is to initiate execution of the quantum service based on the service definition.

13. The quantum computing system of claim 9, wherein to transfer the quantum service to the third quantum computing device is to:
 identify a source qubit of the second quantum computing device associated with the quantum service;
 retrieve a data value of the source qubit from the second quantum computing device;
 allocate a target qubit on the third quantum computing device; and
 set a data value of the target qubit to the data value of the source qubit.

14. The quantum computing system of claim 9, wherein to transfer the quantum service to the third quantum computing device is to:
 identify a source qubit of the second quantum computing device associated with the quantum service;
 retrieve a quantum state of the source qubit from the second quantum computing device;
 allocate a target qubit on the third quantum computing device; and
 set a quantum state of the target qubit to the quantum state of the source qubit.

15. The quantum computing system of claim 9, wherein to transfer the quantum service to the third quantum computing device is to configure the second quantum computing device to transfer a qubit associated with the quantum service to the third quantum computing device.

16. The quantum computing system of claim 9, wherein to initiate execution of the quantum service on the third quantum computing device is to prioritize the execution of the quantum service on the third quantum computing device.

17. A non-transitory computer-readable medium having stored thereon computer-executable instructions that, when executed, cause one or more processor devices to:
 determine, by a first quantum computing device, that a temperature of a second quantum computing device has exceeded a temperature threshold;
 identify a quantum service, executing on the second quantum computing device, to be migrated;
 identify a third quantum computing device as a migration destination for the quantum service;
 configure the second quantum computing device to place the quantum service in an inactive state;
 transfer the quantum service to the third quantum computing device; and
 initiate execution of the quantum service on the third quantum computing device.

18. The non-transitory computer-readable medium of claim 17, wherein:
 to transfer the quantum service to the third quantum computing device is to:
  retrieve a service definition for the quantum service from the second quantum computing device; and
  transmit the service definition for the quantum service to the third quantum computing device; and
 to initiate execution of the quantum service on the third quantum computing device is to initiate execution of the quantum service based on the service definition.

19. The non-transitory computer-readable medium of claim 17, wherein to transfer the quantum service to the third quantum computing device is to:
 identify a source qubit of the second quantum computing device associated with the quantum service;
 retrieve a data value of the source qubit from the second quantum computing device;
 allocate a target qubit on the third quantum computing device; and
 set a data value of the target qubit to the data value of the source qubit.

20. The non-transitory computer-readable medium of claim 17, wherein to transfer the quantum service to the third quantum computing device is to:
 identify a source qubit of the second quantum computing device associated with the quantum service;
 retrieve a quantum state of the source qubit from the second quantum computing device;
 allocate a target qubit on the third quantum computing device; and
 set a quantum state of the target qubit to the quantum state of the source qubit.

* * * * *